US007365675B2

(12) United States Patent
Pearlman et al.

(10) Patent No.: US 7,365,675 B2
(45) Date of Patent: Apr. 29, 2008

(54) MEASURING WIND VECTORS REMOTELY USING AIRBORNE RADAR

(75) Inventors: Jay S. Pearlman, Port Angeles, WA (US); Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 275 days.

(21) Appl. No.: 11/235,487

(22) Filed: Sep. 26, 2005

(65) Prior Publication Data

US 2007/0069941 A1 Mar. 29, 2007

Related U.S. Application Data

(63) Continuation-in-part of application No. 11/235,371, filed on Sep. 26, 2005.

(51) Int. Cl.
*G01S 13/95* (2006.01)
(52) U.S. Cl. ............... 342/26 B; 342/115; 342/192
(58) Field of Classification Search .............. 342/26 B, 342/115, 195
See application file for complete search history.

(56) References Cited

U.S. PATENT DOCUMENTS

| 4,521,857 | A | | 6/1985 | Reynolds, III |
| 4,990,922 | A | * | 2/1991 | Young et al. ............. 342/26 B |
| 5,077,558 | A | * | 12/1991 | Kuntman ................. 342/26 B |
| 5,276,453 | A | * | 1/1994 | Heymsfield et al. ........ 342/116 |
| 5,592,171 | A | | 1/1997 | Jordan |
| 5,757,322 | A | | 5/1998 | Ray et al. |
| 6,018,699 | A | | 1/2000 | Baron, Sr. et al. |
| 6,028,514 | A | | 2/2000 | Lemelson et al. |
| 6,043,756 | A | | 3/2000 | Bateman et al. |
| 6,184,816 | B1 | | 2/2001 | Zheng et al. |
| 6,308,650 | B1 | | 10/2001 | Tsumiyama |
| 6,456,226 | B1 | | 9/2002 | Zheng et al. |
| 6,505,123 | B1 | | 1/2003 | Root et al. |
| 6,563,452 | B1 | | 5/2003 | Zheng et al. |
| 6,707,415 | B1 | | 3/2004 | Christianson |

(Continued)

OTHER PUBLICATIONS

Cordes, J.J. and Flanagan, A., 1995: *Economic Benefits and Costs of Developing and Deploying a Space-based Wind Lidar*, Final Report, NWS Contract No. 43AAnW400223. George Washington University.

(Continued)

*Primary Examiner*—Dan Pihulic
(74) *Attorney, Agent, or Firm*—Harness, Dickey & Pierce, P.L.C.

(57) ABSTRACT

Airborne meteorological radars and related networks and models. In one embodiment a network for creating a meteorological model includes a mobile sensing node and a modeling node. The sensing node includes a meteorological RADAR that senses the wind velocity. Data from the meteorological RADAR regarding the wind velocity is received by a processor of the modeling node which determines a model of the wind from the wind velocity. The modeling node combines data from a second sampling node with the data from the first sampling node to create a resultant wind velocity vector. Preferably, the modeling node and the sampling node(s) communicate over an airborne WAN. Another embodiment provides a method of measuring the wind velocity. The method includes steering an RADAR signal out of the plane of travel of the mobile platform. The wind velocity is measured using a return of the RADAR signal.

31 Claims, 3 Drawing Sheets

U.S. PATENT DOCUMENTS

| | | | |
|---|---|---|---|
| 6,754,585 | B2 | 6/2004 | Root et al. |
| 6,799,014 | B2* | 9/2004 | Rosen et al. ............... 455/12.1 |
| 6,826,481 | B2 | 11/2004 | Root et al. |
| 7,181,345 | B2* | 2/2007 | Rosenfeld et al. ............. 702/3 |
| 2002/0168974 | A1* | 11/2002 | Rosen et al. ............... 455/429 |
| 2004/0043760 | A1* | 3/2004 | Rosenfeld et al. ....... 455/414.3 |
| 2005/0228763 | A1* | 10/2005 | Lewis et al. .................... 706/1 |
| 2006/0121893 | A1* | 6/2006 | Tillotson et al. ............ 455/431 |
| 2007/0069941 | A1* | 3/2007 | Pearlman et al. ......... 342/26 B |
| 2007/0073486 | A1* | 3/2007 | Tillotson et al. ............... 702/3 |
| 2007/0162328 | A1* | 7/2007 | Reich .......................... 705/14 |

OTHER PUBLICATIONS

Masters, Dallas, et al., *GPS Signal Scattering from Land for Moisture Content Determination*, date unknown, 3 pgs.

Garrison, James L. and Katzberg, Stephen J. *The Application of Reflected GPS Signals to Ocean Remote Sensing*, Remote Sensing of Environment (2000), pp. 175-187, vol. 73, Elsevier Science Inc., New York USA.

Rocken, Christian, *Special Study Group 2.161 Report Report Probing the Atmosphere by GPS*; date unknown, pp. 1-12, COSMIC Program Office University Corp. for Atmospheric Research (UCAR), Boulder, CO USA.

http://www.ghcc.msfc.nasa.gov/sparcle_quotes2.html, *Are Space-Based Global Winds Desired? Sparkle Quotes (2) NASA*, May 20, 2005.

http://www.ipo.noaa.gov/, *What Is NPOESS?* NOAA Satellite and Information Service, May 20, 2005, pp. 1-3.

\* cited by examiner

MEASURING WIND VECTORS REMOTELY USING AIRBORNE RADAR

RELATED APPLICATIONS

This application is a continuation in part of U.S. patent application Ser. No. 11/235,371, entitled Airborne Weather Profiler Network, filed by Tillotson on Sep. 26, 2005, which is incorporated herein as if set forth in full.

FIELD

This disclosure relates generally to meteorological radars and, more particularly, to airborne meteorological radars adapted to measure wind related Doppler effects with a high degree of resolution.

BACKGROUND

Current meteorological models are limited in their capabilities by the quality and quantity of available weather data. In particular, the sensors that gather weather data are few and far between in remote areas such as deserts, the polar regions, and oceans. The Eastern Pacific Ocean is one such example and has only a few weather buoys scattered along thousands of miles of United States coast. Since weather moves in from the Pacific in the western United States, the lack of data regarding the weather over the Pacific hinders the ability of forecasters to predict the weather in these coastal areas. Furthermore, while conditions near the ground can be readily sensed, conditions aloft can only be sensed remotely or on limited occasions (e.g. during the ascent of a radiosonde). Moreover, weather conditions can change rapidly thereby rendering what data has been gathered stale and inaccurate. In particular, wind measurements are an important part of the data that is needed to model the weather. For these reasons, among others, a need exists to improve the quality and quantity of readily accessible weather data including wind velocity data.

SUMMARY

It is in view of the above problems that the present disclosure was developed. The disclosure provides apparatus and methods to remotely measure wind vectors at multiple altitudes.

In a first embodiment, the present disclosure provides airborne meteorological radar units that measure wind data at many locations. The data gathered by these novel radar units includes wind speed and direction at all altitudes above the location where the winds are measured. The units also provide this data in a timely and frequent fashion. Preferably, the units ride aboard commercial transport aircraft although any type of aircraft (or other vehicle) could carry the radar units. Some of the advantages of mounting the radar units on large transports are that these aircraft over fly much of the globe, at all times of day and night, and do so on a frequent basis. Thus, the present disclosure provides a system that greatly expands the quantity and quality of wind, data available for use in weather models for example.

More particularly, the airborne meteorological radar units (hereinafter "weather radars") provided by the present disclosure may be enhanced in several ways. In a first aspect of the present disclosure, the declination range of the airborne weather radars may be extended, so that the units can scan above and below the flight path. Preferably, the declination range extends in a downward direction to an angle of at least 45 degrees. For embodiments that use phased array antennas, it is that the phase shifters, or the software that controls the phase shifters, are configured and adapted to accomplish the improved declination range. In another aspect of the present disclosure, the weather radars are improved to directly measure the wind velocity and direction with a high resolution that heretofore has not been available from airborne radars. In other words, the airborne weather radars provided by the present disclosure are configured and adapted to make Doppler measurements of the wind velocity with a resolution of about 3 meters per second and wind direction with a resolution of about a tenth of a radian or about 5 circular degrees (assuming a 30 meters per second vertical wind speed). In contrast, previously available airborne radars measure the concentration of precipitation, not the wind itself. Moreover, these previously available radars are only able to resolve six discrete levels of precipitation.

In yet another aspect, the airborne weather radars provided by the present disclosure may also be configured and adapted to have range gates that are adjusted to enable the detection of the weak radar returns from atmospheric dust or water vapor. In other words, the range gates are adjusted so that these weak returns from close to the aircraft are allowed to pass to the detector rather than being discarded because they arrive before the range gate opens.

In still another aspect of the present disclosure, the airborne weather radars provided by the present disclosure are configured and adapted to sweep below (or above) the flight path of the aircraft on which they reside. More particularly, the scan patterns provided by the present disclosure can include sweeps wherein the surface of the Earth is scanned particularly when the airborne weather radar (or rather, the aircraft on which it resides) is over water. The returns from the water can thus be analyzed to characterize pre-selected surface attributes such as wave amplitude, wavelength, and direction of travel. Furthermore, this information can be correlated with low-altitude wind velocities over the body of water. This advantage of the present disclosure allows these low-altitude winds to be measured remotely despite the possibility that the weak radar returns generated by the atmospheric aerosols can be overwhelmed by ground clutter. Additionally, these surface returns may also be used for other types of remote sensing that are unrelated to winds velocity measurement. The present disclosure also provides a computer that combines navigation data from the aircraft with measurements of wind velocity made with airborne weather radars. The computer can be on the aircraft that carries the weather radar or on the ground, depending in part on the relative cost of air-to-ground communication verse onboard computational power.

In another embodiment, the disclosure includes networks, systems, and methods to combine wind velocity data from multiple airborne weather radars. Each of the wind velocity measurements may be made at different locations or some of the measurements may be made at the same location. In the case in which the measurements are made at the same location, the multiple measurements can be mathematically combined (for example by the root sum squares method) to improve the accuracy of the wind velocity measurement. One source of improvement in the measurement arises from the direction from which each of the multiple measurements is made. This is significant in that each Doppler velocity measurement detects one component of the velocity along the direction of the radar return. Thus, with multiple measurements made from different directions multiple velocity components are measured. These components can then be down-linked to a facility and analyzed to determine the overall wind speed and direction (i.e. the velocity). The analysis includes combining navigation data from the aircraft involved and the measured wind velocities. Accordingly, the present disclosure is relatively insensitive to sensing, or viewing, geometry. In another embodiment, the weather radar is configured and adapted to also scan to either side of the aircraft's flight path.

In yet another embodiment, the present disclosure provides a computer network for building weather models from the meteorological property profiles. The network of the current embodiment includes remote profiling instruments (e.g., "vertical profilers") mounted on commercial aircraft, unmanned aerial vehicles, or other mobile platforms which are networked together via a communications network or system. Each of the vehicles therefore represents a sensing node of the network. Since the sensing nodes are mobile, the present disclosure allows gathering profiles over a larger region than was heretofore possible. A modeling node with a processor communicates with the sensing nodes to receive the gathered profiles and use them as inputs to a three dimensional weather model. The processor can also use the model to forecast the weather in the region where the profiles were gathered or even over adjacent areas.

Further features and advantages of the present disclosure, as well as the structure and operation of various embodiments of the present disclosure, are described in detail below with reference to the accompanying drawings.

BRIEF DESCRIPTION OF THE DRAWINGS

The accompanying drawings, which are incorporated in and form a part of the specification, illustrate exemplary embodiments of the present disclosure and together with the description, serve to explain the principles of the disclosure. In the drawings.

DETAILED DESCRIPTION

Figure 1:
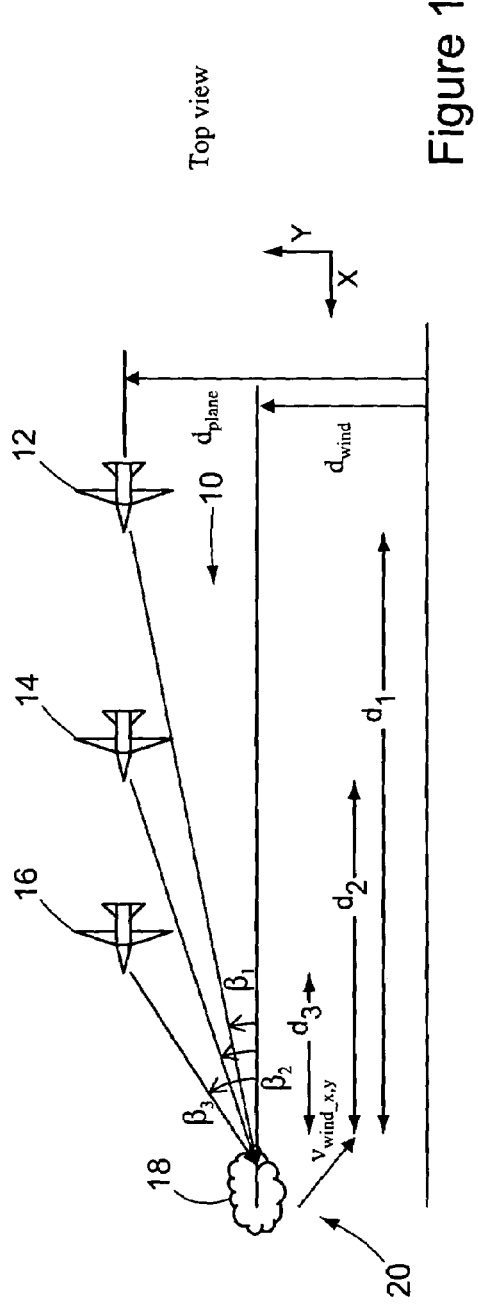
FIG. 1 illustrates a system for measuring the wind that is constructed in accordance with the principles of the present disclosure.

Referring to the accompanying drawings in which like reference numbers indicate like elements, FIG. 1 illustrates a wind vector measuring system constructed in accordance with the principles of the present disclosure.

Figure 2:
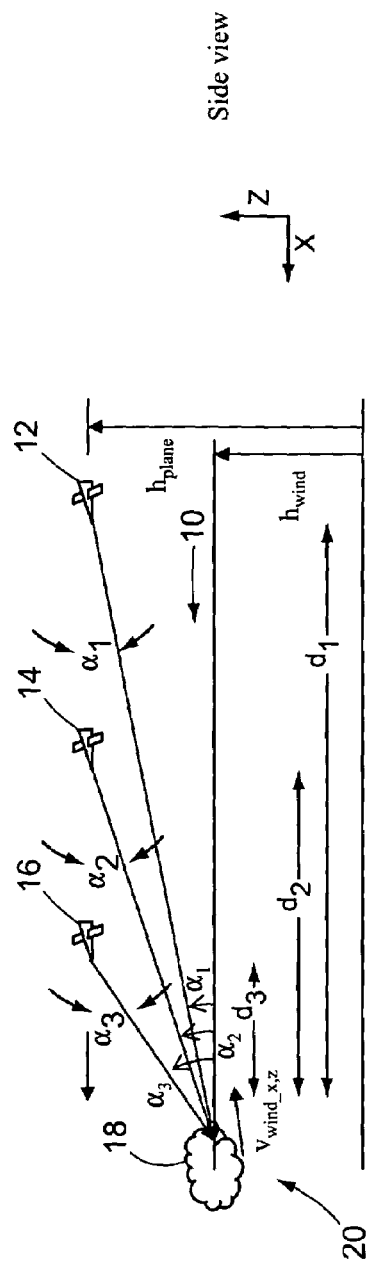

The exemplary system 10 shown in FIG. 1 includes several aircraft 12, 14, and 16 equipped with airborne meteorological radar units (hereinafter "weather radars") that typically detect precipitation 18 (shown schematically as a cloud) in the projected flight path of the aircraft 12, 14, and 16. Of course, the several aircraft 12, 14, and 16 could instead be one aircraft shown at different times as it travels along its flight path. The weather radars aboard the aircraft 12, 14, and 16 have been modified to detect the wind velocity $v_{wind}$ not only along the projected flight path(s) but also in areas 20 offset from the flight path. For example, the area 20 where the wind velocity $v_{wind}$ will be measured is shown in FIG. 1 as being offset from the projected flight path both vertically and laterally by the distances $h_{plane}$-$h_{wind}$ (FIG. 2) and $d_{plane}$-$d_{wind}$ (FIG. 1) respectively. In the general case, the various distances $h_{plane}$-$h_{wind}$ and $d_{plane}$-$d_{wind}$ need not be the same whether several aircraft 12,14, and 16 participate in the system 10 or one aircraft 12 makes the multiple measurements from different locations. Of course, the aircraft 12, 14, and 16 are also separated from the area 20 by, respectively, distances d1, d2, and d3 in a direction parallel to the flight path (FIG. 1). Regarding the flight path, it can be straight as shown or it may define a curvilinear trace through the atmosphere. Furthermore, each of the aircraft 12, 14, and 16 have an orientation which is shown as being steady and level thereby defining a plane that includes the flight path and that is oriented in the same direction as the aircrafts' 12, 14, or 16 orientation. Of course, since the aircraft 12, 14, and 16 can maneuver and reorient themselves, the plane defined by the orientation of the aircraft 12, 14, or 16 reorients with the aircraft 12, 14, or 16. Nonetheless, the airborne weather radars on the aircraft 12, 14, and 16 can scan substantially out of the plane and can scan laterally (in parallel with the plane) away from the flight path by a substantial angle. Thus, the airborne weather radars provide significant freedom in choosing where the wind velocity measurements may be made relative to the aircraft 12, 14, and 16.

When it is desired to make a measurement of the wind velocity $v_{wind}$ at the location 20, the weather radar signal is scanned to an angle $\alpha_1$ in the x-z plane and an angle $\beta 1$ in the x-y plane. A pulse of electromagnetic energy (i.e., a RADAR signal) is then transmitted toward the location 20. Dust, aerosols, particulates, and precipitation entrained in the wind at location 20 reflect the RADAR signal thereby causing a Doppler shift in the reflected signal. The weather radar unit about the aircraft 12 receives the RADAR return and detects the Doppler shift caused by the velocity of the material entrained in the wind. Accordingly, a measure of the wind velocity $v_{wind}$ can be derived from the Doppler shift. By noting the current location of the aircraft 12 (via for instance a GPS system), the distance to the location 20, and the angles $\alpha_1$ and $\beta 1$, it is possible to establish where the wind velocity measurement was made.

Of course, the Doppler shift is proportional to the component of the wind velocity Vwind that is parallel to the path of the RADAR signal. Accordingly, the sensed wind velocity Vwind from any given aircraft 12 at any given time may not sense the entire value of the wind velocity. However, another aircraft 14 at a different location can be used to obtain another measurement of the wind velocity vwind at the same location 20. In the alternative, the first aircraft 12 may fly to a different location and make a second remote wind velocity measurement from that second location. With two different views to the location 20 of the wind velocity measurement, two wind velocity components can therefore be sensed by the system 10. These wind velocity components, along with the locations of the relevant aircraft 12, 14, or 16 and the deflection angles $\alpha$, $\beta$ of the radar signals, can then be mathematically combined to yield a resultant wind velocity measurement at the location 20. Thus, the present disclosure allows airborne Doppler radars to measure true wind velocities instead of merely measuring a particular component of the wind velocity vwind where the viewing angles (e.g., $\alpha_1$, $\beta_1$ and $\alpha_1$, $\beta_2$) determine the component of the wind velocity that will be measured. In contrast, previously available airborne weather radar units are constrained to operate within small scan angles by the design requirements associated with the aircraft 12, 14, or 16. For instance, in the previously available weather radar units, the maximum vertical scan angle a is limited to 20 to 25 degrees. In. accordance with the principles of the present disclosure the declination scan angle of the airborne weather radars is increased to at least 45 degrees both above and below the flight path (or orientation) of the aircraft 12. One method of accomplishing this modification to existing airborne weather radars, which use phased array antennas, is to add more phase shift values in the phased array to increase the declination angle α of the airborne weather radars of the present disclosure. In addition, the range gate of the airborne weather radars provided herein can be shortened to avoid detecting returns from ground clutter when the radar signal is steered to large deflection angles α below the horizon (and therefore the radar signal nears, or intersects, the ground). Thus one of the advantages provided by the present disclosure is that previous airborne weather radars could sense precipitation in only a small viewing area (or cone) in front of the aircraft whereas the present disclosure greatly expands the viewing area seen by the airborne weather radars. Accordingly, increasing the deflection angle α vastly increasess the amount of wind velocity data that can be made available for weather modeling. In a similar manner, the lateral deflection angles may also be increased beyond the range of the previously available airborne weather radar approaches in a similar manner. Thus, the airborne weather radars provided by the present disclosure can paint a more complete picture of the winds surrounding the aircraft 12, 14, or 16 than the previously available approaches.

Figure 3:
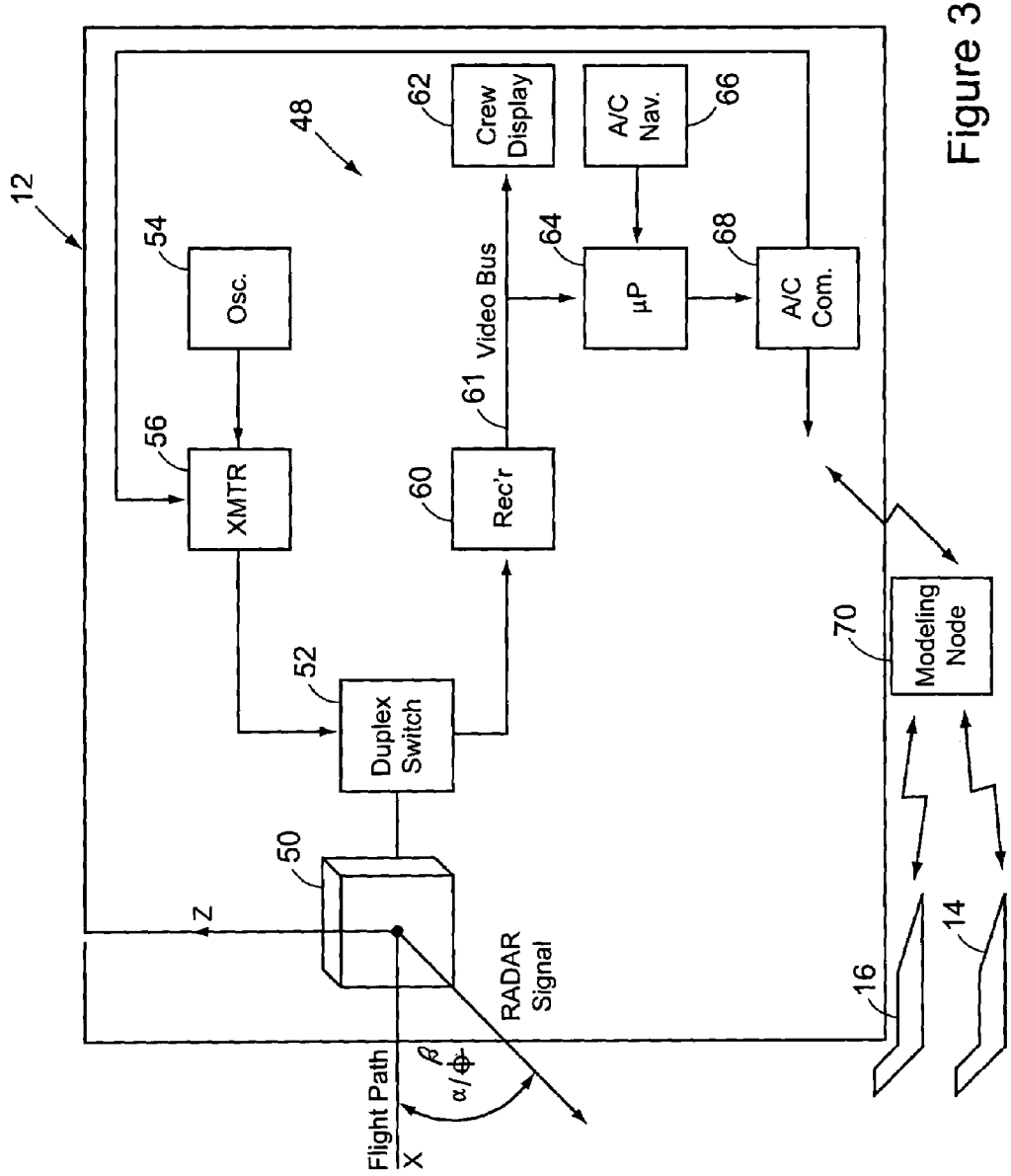

Preferably, the existing systems of the aircraft 12, 14, and 16 can be modified to obtain the improved wind data from the airborne weather radars of the present disclosure. FIG. 3 schematically shows an exemplary wind velocity measurement subsystem that has been integrated with the aircraft 12 of FIG. 1. The subsystem 48 includes a radar antenna 50, a duplex switch 52, an oscillator 54, a radar transmitter 56, a radar receiver or detector 60, a crew display 62, a processor 64, a communication link to an aircraft navigation subsystem 66, and an aircraft communication subsystem 68. FIG. 3 also shows a modeling node 70 in communication with the aircraft 12 which can be considered a sensing node. These devices 52, 54, 56, 60, 62, 64, 66, 68, and 70 are interconnected as shown and cooperate to measure the wind velocity at locations 20 (see FIG. 1) which are remote from the aircraft 12.

More particularly, the oscillator 54 and transmitter 56 generate a radar signal or pulse and steer the pulse to the location 20 with the phased array antenna 50 which lies at the angles α and β relative to the orientation of the aircraft 12. The radar return from the wind at the location 20 returns through the duplex switch and is routed to the detector 60 where the distance to the location 20 is measured along with Doppler shift caused by the wind. From the Doppler shift, the detector 60 determines the component of the wind velocity that lies in the direction of the radar return. The receiver 60 then places the wind velocity measurement on the aircraft's video data bus along with data regarding precipitation that the weather radar subsystem detects. This weather data is received on the crew display 62 and the processor 64 for display and analysis respectively. The processor 64 examines the data on the video bus and extracts the wind velocity measurements along with the angles α, β, α, β, and the distance to the measurement location 20. Thus, the processor 64 can combine this data to determine where the location 20 is relative to the aircraft 12. Additionally, the processor 64 obtains data related to the location of the aircraft 12 from the aircraft's navigation subsystem 66. Using the navigation information, the processor 64 then determines the absolute location of the measurement location 20 and communicates the wind velocity information and the location 20 of the measurement to the aircraft communication system 68. In turn, the communication system 68 transmits the information to the modeling node 70. Of course, the modeling node 70 is likely to be in communication with other sensing nodes such as the aircraft 14 and 16 to obtain other wind velocity measurements. The modeling node 70 uses the wind velocity and location 20 information and, if desired, combines the wind velocity measurements at a single location 20 into a resultant wind velocity measurement. Also, the modeling node 70 builds a model of the weather in the region near the location 20.

Thus, the airborne weather radars of the present disclosure can be configured to transmit the wind velocity data onto the aircraft's video bus 61. The processor 64 can process the data on the video bus 61 to extract the various wind vectors, wind vector components (or radial vectors), and associated locations 20. Since previously available airborne radars put weather data on the video bus 61 (for display in the cockpit), the video bus 61 is a convenient place to obtain the wind data without requiring modifications to the aircraft 12. From the processor 64, the wind data is down-linked to the modeling node 70 or a processing center on the ground. Of course, an existing processor or other circuit already on the video bus 61 could be reprogrammed to perform these novel functions. In the opposite direction, commands from the modeling node 70 can be up-linked to the aircraft 12 to direct the wind velocity subsystem 48 to measure the wind at locations 20 desired by the modeling node 70. The commands can be forwarded to the transmitter 56 by the communication system 68 so that the transmitter can adjust the scan angles and range gates as necessary to comply with the modeling node 70 commands.

Figure 4:
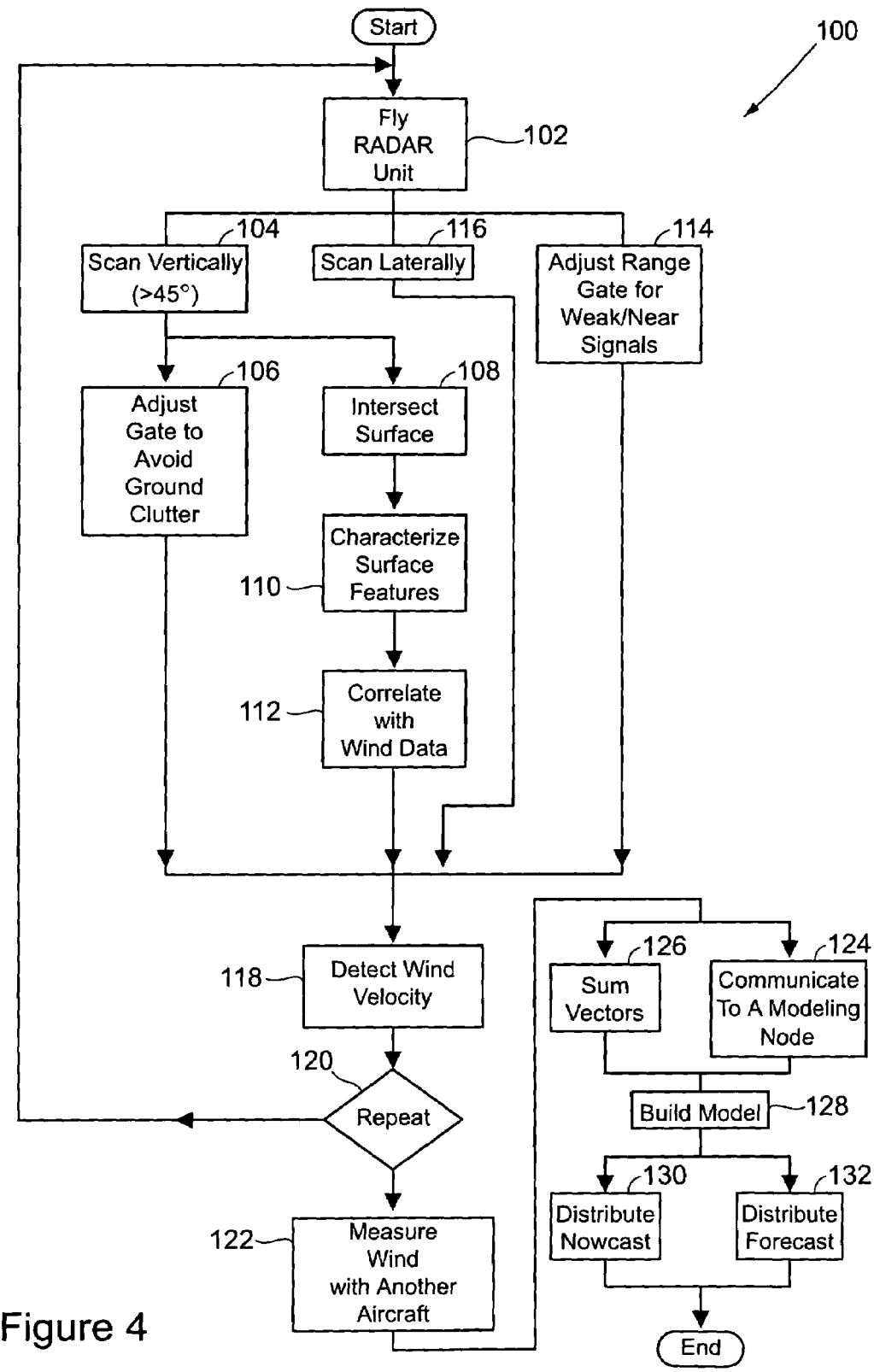
FIG. 4 illustrates a method in accordance with the principles of the present disclosure.

Turning now to FIG. 4, a method in accordance with the principles of the present disclosure is illustrated. Generally, the method 100 includes using an airborne weather radar to measure the velocity of the wind while the aircraft, on which the radar is located, is in flight. See operation 102. The signal from the weather radar is steered out of the plane of the aircraft's flight path as in operation 104. More particularly, the radar signal is steered to an angle greater than or equal to 45 degrees at some point in the flight. If desired, the range gate of the weather radar can be adjusted to avoid detecting ground clutter when the signal is steered toward the ground as in operation 106. In the alternative, the range gate can be adjusted so that the weather radar picks up and measures features of the surface. More particularly, as shown in operations 108, 110, and 112 if the aircraft is over (or near) a large body of water, the waves on the surface can be characterized and correlated with the winds in the vicinity. Of course, the airborne weather radar can be steered laterally in operation 114 in addition to being scanned vertically in operation 104.

As shown at reference 116, the range gate can be adjusted so that the airborne weather radar picks up signals at a close range. By adjusting the range gate in this manner it allows the weather radar to detect the weak returns from the wind near the aircraft. Since the entrained material that generate these returns are near the aircraft, the relative strength of the returns is larger than the equivalent returns from material at larger, conventional ranges from the aircraft. Because of the signal strength of these near returns, the airborne weather radar is able to detect the wind velocity with corresponding accuracy and resolution. Preferably, the range gate is adjusted to detect returns from just outside of the near field of the aircraft where the ambient air is un-affected by the passage of the aircraft through the atmosphere.

In any case, the airborne weather radar measures a wind velocity as illustrated in operation 118. Operation 120 illustrates that, if desired, the foregoing operations shown by FIG. 3 can be repeated. Or another aircraft can make a measurement of the wind velocity as shown at reference 122. The second measurement can be of the wind velocity at the same location as the measurement made by the first aircraft. See operation 122. Either, or both, of the wind velocity measurements may be communicated to a modeling node over an airborne wide area network (see operation 124). If more than one measurement is made at a particular location, then the two sensed radial components of the wind velocity can be mathematically combined (assuming that the two viewing angles were somewhat different) to yield the resultant wind velocity vector as shown by operation 126. Once the measurements are made, they may then be incorporated in a meteorological model in operation 128. From the model, nowcasts and forecasts of the weather can then be distributed in operations 130 and 132 respectively.

In operation, a typical wind measurement can be made as follows. An airliner, unmanned aerial vehicle, military transport, or other mobile platform that is equipped with a weather radar flies due north (zero degrees heading) at 35,000 feet. At 20,000 feet above the location where wind velocity data is desired the wind is blowing southeast (135 degrees heading) at 50 knots. As the aircraft is approaching the desired location but still several miles away, the weather radar is scanned downward at, for instance, 15 degrees to measure the wind velocity via the return signal. The measured Doppler shift associated with the wind entrained material is proportional to the dot product of the wind vector (135 degrees heading and zero vertical) and the radar vector (due north and 15 degrees downward). The weather radar emits another radar pulse, but at 30 degrees below horizontal. The measured Doppler shift for this pulse is proportional to the dot product of the wind vector (still 135 degrees heading and zero vertical) and the new radar vector (due north and 30 degrees downward). Again, the weather radar scans with the measured Doppler shift based on a radar vector that is now 45 degrees downward. Given the changing Doppler shift at each look-down angle, plus information about where the aircraft was located during each scan, the computer calculates the most probable wind vector at 20,000 feet above the desired surface location. The flexibility of the airborne weather radar provided herein thus allows one aircraft to hold the radar on a particular location while measuring the wind velocity as the aircraft flies by the measurement location.

In view of the foregoing, it will be seen that the several advantages of the disclosure are achieved and attained. The quantity and quality of wind velocity data is greatly expanded by the improved airborne weather radars provided by the present disclosure. Also, using aircraft to gather wind velocity measurements remotely in accordance with the present disclosure also greatly expands the availability and quality of wind velocity measurements. In turn, numerous benefits flow from the improved meteorological models that can be built using the improved wind velocity data. More specific benefits are described in U.S. patent application Ser. No. 11/235,371, entitled Airborne Weather Profiler Network, filed by Tillotson on Sep. 26, 2005, which is incorporated herein as if set forth in full.

The embodiments were chosen and described in order to best explain the principles of the disclosure and its practical application to thereby enable others skilled in the art to best utilize the disclosure in various embodiments and with various modifications as are suited to the particular use contemplated.

As various modifications could be made in the constructions and methods wherein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the exemplary embodiments, but should be defined in accordance with the claims and their equivalents.

What is claimed is:

1. A network for creating a meteorological model, the network comprising:
    a mobile sensing node including a meteorological RADAR unit, the meteorological RADAR unit adapted to sense a wind velocity at a location remote from the mobile sensing node and divergent from a flight path of said mobile sensing node; and
    a modeling node including a processor, the processor in communication with the meteorological RADAR unit, to receive data from the meteorological RADAR unit regarding the sensed wind velocity, the processor being adapted to determine a model of the wind from the sensed wind velocity at the remote location.

2. The network of claim 1, wherein the sensing node is a first sensing node, the sensed wind velocity being a first sensed wind velocity, the network further comprising a second sensing node in communication with the modeling node to sense a wind velocity at a location where the first sensing node sensed the first sensed wind velocity, the modeling node adapted to determine a resultant wind velocity from the first and the second sensed wind velocities.

3. The network of claim 1, wherein the modeling node is a sensing node.

4. The network of claim 1 further comprising an airborne segment through which the sensing node and the modeling node communicate.

5. The network of claim 1, wherein an aircraft comprises the sensing node.

6. A method of measuring wind velocity comprising:
    steering an airborne RADAR antenna on a mobile platform to direct a RADAR signal out of a plane of travel associated with the mobile platform; and
    measuring the wind velocity via a return of the RADAR signal.

7. The method of claim 6, wherein the steering the antenna further comprises steering the antenna to at least 45 degrees out of the plane of travel.

8. The method of claim 6, wherein the measuring the wind velocity further comprises measuring a Doppler shift between the RADAR signal and the return of the RADAR signal.

9. The method of claim 6 further comprising adjusting a range gate associated with the RADAR antenna whereby the measuring of the wind velocity occurs at a range that is shorter than a nominal range associated with the antenna.

10. The method of claim 6, wherein the steering of the RADAR antenna further comprises steering the antenna to direct the RADAR signal to intersect with the surface of the Earth.

11. The method of claim 10 further comprising characterizing a feature of the surface.

12. A method comprising:
    utilizing a remote wind speed measuring device to measure a first velocity component of wind that is within a first volume of space, the first velocity component being oriented in a first direction with respect to the earth, the wind speed measuring device being within a second volume of space when the first velocity component is measured, the first and second volumes, of space being distinct from each other and stationary with respect to the earth;

utilizing the remote wind speed measuring device to measure a second velocity component of wind that is in the first volume of space, the second velocity component being oriented in a second direction with respect to the earth, the second direction being different from the first direction, the wind speed measuring device being within a third volume of space with respect to the earth when the second velocity component is measured, the third volume of space being distinct from the first and second volumes of space and stationary with respect to the earth; and utilizing the first and second velocity components to estimate a resultant velocity of wind within the first volume of space, the resultant velocity being oriented in a third direction with respect to the earth that is different from each of the first and second.

13. The method in accordance with claim 12, wherein the method further comprises utilizing the remote wind speed measuring device to measure a third velocity component of wind that is within the first volume of space, the third velocity component being oriented in a fourth direction with respect to the earth, the fourth direction being different from each of the first, second, and third directions, the wind speed measuring device being within a fourth volume of space when the third velocity component is measured, the fourth volume of space being distinct from each of the first, second, and third volumes of space and stationary with respect to the earth, and wherein the step of utilizing the first and second velocity components to estimate the resultant velocity also comprises utilizing the third velocity component to estimate the resultant velocity.

14. The method in accordance with claim 12, wherein the remote wind speed measuring device is moving relative to the earth during each of the operation of utilizing the remote wind speed measuring device to measure the first velocity component and utilizing the remote wind speed measuring device to measure the second velocity component.

15. The method in accordance with claim 14, wherein the remote wind speed measuring device is secured to an aircraft.

16. The method in accordance with claim 15, wherein the operation of utilizing the first and second velocity components to estimate the resultant velocity of wind within the first volume of space occurs external to the aircraft.

17. The method in accordance with claim 15, wherein the operation of utilizing the remote wind speed measuring device to measure the first velocity component occurs in a manner such that the first direction is at least forty-five degrees from horizontal.

18. The method in accordance with claim 12, wherein the method further comprises the operation of transmitting data that is dependent upon the first and second velocity components to at least one remote computer, transmitting data obtained by other wind speed measuring devices to the at least one computer, and utilizing the at least one computer to generate a weather model that is dependent upon the first and second velocity components and upon the data obtained by the other wind speed measuring devices.

19. The method in accordance with claim 12, wherein the wind speed measuring device comprises a phased array RADAR.

20. The method in accordance with claim 19, wherein the wind speed measuring device comprises a RADAR receiver, and wherein the method further comprises a step of adjusting range gates of the RADAR receiver.

21. A method comprising:

utilizing a remote speed measuring device to measure a first velocity component of ocean waves that are within a first volume of space, the first velocity component being a being oriented in a first direction with respect to the earth, the speed measuring device being within a second volume of space when the first velocity component is measured, the first and second volumes of space being distinct from each other and stationary with respect to the earth;

utilizing the remote speed measuring device to measure a second velocity component of ocean waves that are within the first volume of space, the second velocity component being oriented in a second direction with respect to the earth, the second direction being different from the first direction, the speed measuring device being within a third volume of space when the second velocity component is measured, the third volume of space being distinct from the first and second volumes of space and stationary with respect to the earth; and utilizing the first and second velocity components to estimate a resultant velocity of ocean waves within the first volume, the resultant velocity being oriented in a third direction with respect to the earth that is different from each of the first and second directions.

22. The method in accordance with claim 21, wherein the method further comprises utilizing the remote speed measuring device to measure a third velocity component of ocean waves that are within the first volume of space, the third velocity component being oriented in a fourth direction with respect to the earth, the fourth direction being different from each of the first, second, and third directions, the remote speed measuring device being within a fourth volume of space when the third velocity component is measured, the fourth volume of space being distinct from each of the first second, and third volumes of space, and wherein the step of utilizing the first and second velocity components to estimate the resultant velocity also comprises utilizing the third velocity component to mathematically estimate the resultant velocity.

23. The method in accordance with claim 21, wherein the remote speed measuring device is moving relative to the earth during each of the steps of utilizing the remote speed measuring device to measure the first velocity component and utilizing the remote speed measuring device to measure the second velocity component.

24. The method in accordance with claim 23, wherein the remote speed measuring device is secured to an aircraft.

25. The method in accordance with claim 24, wherein the operation of utilizing the remote speed measuring device to measure the first velocity component occurs in a manner such that the first direction is at least forty-five degrees from horizontal.

26. The method in accordance with claim 21, wherein the method further comprises transmitting data that is dependent upon the first and second velocity components to at least one remote computer, transmitting data obtained by other speed measuring devices to the at least one computer, and utilizing the at least one computer to generate a weather model that is dependent upon the first and second velocity components and upon the data obtained by other speed measuring devices.

27. The method in accordance with claim 21, wherein the speed measuring device comprises a phased array RADAR.

28. The method comprising:

estimating atmospheric wind speed using an airborne phased array RADAR to obtain a plurality of wind velocity components of wind that is within a volume of space, by moving the airborne phased array RADAR to a plurality of different locations relative to the volume of space, the volume of space being fixed relative to the earth, the airborne phased array RADAR being oriented at different radial directions from the volume of space when each of the wind velocity components is obtained.

29. The method in accordance with claim 28, wherein air within the volume of space has an actual direction of travel and an actual magnitude of velocity in the actual direction of travel, and wherein the operation of estimating atmospheric wind speed is performed in a manner such that the root sum squares of the wind velocity components yields a resultant wind velocity that has a magnitude that is within three meters per second of the actual magnitude of velocity.

30. The method in accordance with claim 28, wherein the operation of estimating atmospheric wind speed comprises calculating a resultant wind velocity magnitude and direction from the wind velocity components.

31. The method in accordance with claim 30, wherein the operation of estimating atmospheric wind speed occurs in a manner such that the resultant wind velocity direction has a vertical component.

* * * * *